Oct. 24, 1933.    F. A. STEVENS    1,931,941
OPHTHALMIC MOUNTING
Filed Dec. 30, 1930
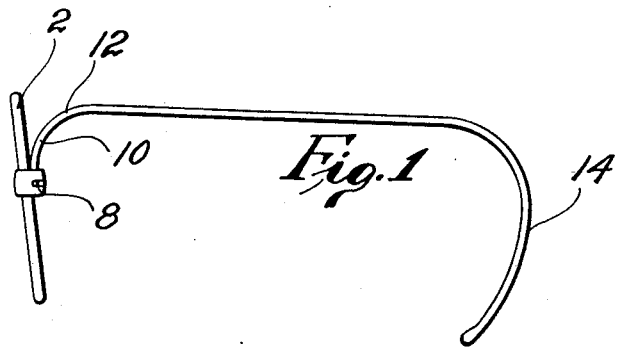
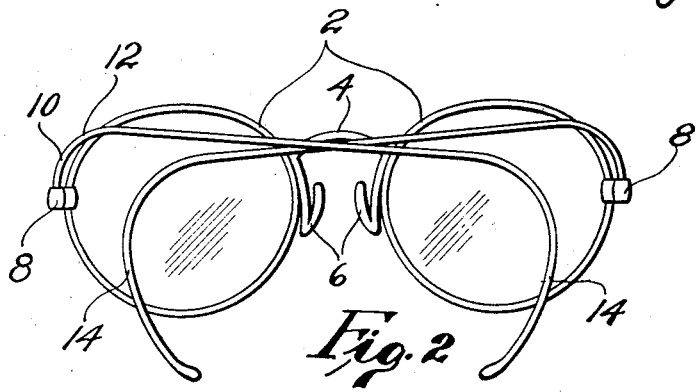
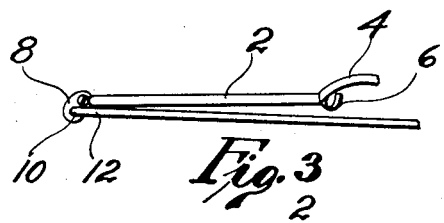
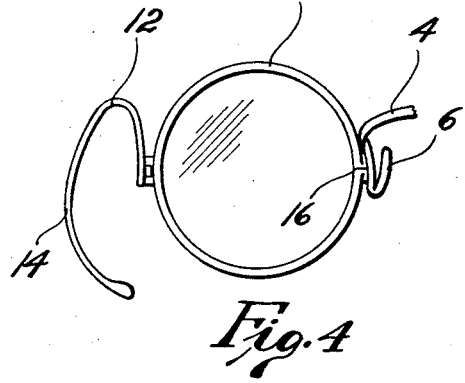
Inventor
Frederick A. Stevens
By David Rines
Attorney Patented Oct. 24, 1933

1,931,941

UNITED STATES PATENT OFFICE 1,931,941

OPHTHALMIC MOUNTING

Frederick Arthur Stevens, Providence, R. I.

Application December 30, 1930
Serial No. 505,571

2 Claims. (Cl. 88—53)

The present invention relates to ophthalmic mountings, and more particularly to temples for the same, and among its objects is to provide a novel temple and a novel connection between the temple and the lenses or lens-holding member. Other and further objects will be explained hereinafter, and will be particularly pointed out in the appended claims.

The invention will be explained in connection with the accompanying drawing, in which Fig. 1 is a side elevation of an ophthalmic mounting embodying my invention, the guards being omitted for clearness; Fig. 2 is a rear elevation of the same; Fig. 3 is a fragmentary plan view of the same; and Fig. 4 is a corresponding fragmentary front view of the same.

The ophthalmic mounting is shown provided with two lens-holding members 2 connected by a rigid bridge 4 and having guards 6 spaced at a constant distance by the rigid bridge 4. The mounting is provided with two temples, each pivoted to its corresponding lens at a point 8 disposed at the outer side of the lens at approximately a central, horizontal line of the lens. From the pivotal point 8, the temple extends abruptly upward at 10, and curves gradually upward and rearward at 12, towards the wearer's ear, to form a curve of relatively short radius. Under this short-radius curve 12, the wearer's eye may, of course, have unobstructed vision. The temple ends in an ear hook 14 or other usual shape. In Fig. 1, the temple is shown open, and in Fig. 2 closed.

The curve 12 is adjustable to vary the angularity of the lenses, as illustrated in Fig. 1, all that is necessary, for this purpose, being to increase or diminish the radius of the curve 12. This is a great simplification over angling methods at present in use.

The eye wires 2 may open either near the point 8 of pivotal connection of the temple or, preferably, near the bridge, at 16, in which event the hinge joint 8 would be of the ordinary hinge type, the rim not being split at that point.

It will be understood that the invention is not restricted to the exact embodiment herein illustrated and described, but that modifications may be made by persons skilled in the art, and all such are considered to fall within the scope of this invention.

What is claimed is:

1. A pair of spectacles comprising two lenses, a rigid bridge connecting the lenses, and a temple for each lens, each temple being pivoted at one of its ends to its corresponding lens at a point disposed at the outer side of the lens at approximately a central, horizontal line of the lens and extending abruptly upward away from its point of pivotal connection and curving gradually upward and rearward toward the wearer's ear to form a curve of relatively short radius under which the wearer's eye may have unobstructed vision, the other end of the temple extending beyond the wearer's ear.

2. A pair of spectacles comprising two lenses, a rigid bridge connecting the lenses, guards spaced at a constant distance by the rigid bridge, and a temple for each lens, each temple being pivoted at one of its ends to its corresponding lens at a point disposed at the outer side of the lens at approximately a central, horizontal line of the lens and extending abruptly upward away from its point of pivotal connection and curving gradually upward and rearward toward the wearer's ear to form a curve of relatively short radius under which the wearer's eye may have unobstructed vision, the other end of the temple extending beyond the wearer's ear.

FREDERICK ARTHUR STEVENS.